United States Patent
Kanemoto et al.

(10) Patent No.: US 12,044,798 B2
(45) Date of Patent: Jul. 23, 2024

(54) LEARNING MODEL, SIGNAL PROCESSOR, FLYING OBJECT, AND PROGRAM

(71) Applicant: Space Shift, Inc., Tokyo (JP)

(72) Inventors: Naruo Kanemoto, Tokyo (JP); Shigeki Kuzuoka, Tokyo (JP); Ryo Saito, Tokyo (JP)

(73) Assignee: SPACE SHIFT, INC., Tokyo (JP)

( * ) Notice: Subject to any disclaimer, the term of this patent is extended or adjusted under 35 U.S.C. 154(b) by 0 days.

(21) Appl. No.: 17/799,559

(22) PCT Filed: Jan. 21, 2022

(86) PCT No.: PCT/JP2022/002203
§ 371 (c)(1),
(2) Date: Dec. 22, 2022

(87) PCT Pub. No.: WO2022/264473
PCT Pub. Date: Dec. 22, 2022

(65) Prior Publication Data
US 2024/0027580 A1    Jan. 25, 2024

(30) Foreign Application Priority Data
Jun. 18, 2021    (JP) .................. 2021-101963

(51) Int. Cl.
G01S 7/41    (2006.01)
G01S 13/90    (2006.01)
(52) U.S. Cl.
CPC .......... *G01S 7/417* (2013.01); *G01S 13/9027* (2019.05)
(58) Field of Classification Search
CPC ..................... G01S 7/417; G01S 13/9027
See application file for complete search history.

(56) References Cited

U.S. PATENT DOCUMENTS 11,262,447 B2    3/2022 Inaba et al.
2011/0043402 A1    2/2011 Sasakawa
(Continued)

FOREIGN PATENT DOCUMENTS

CN    110651157 A    1/2020
CN    110991257 A    4/2020
(Continued)

OTHER PUBLICATIONS

Fan, T.T. et al., "Deep Learning of Raw Radar Echoes for Target Recognition", 2018 IEEE International Conference on Computational Electromagnetics (ICCEM) [online], the U.S., IEEE, Oct. 18, 2018, Internet: <URL:https://ieeexplore.ieee.org/document/8496666><DOI: 10.1109/COMPEM.2018.8496666>, 2 Pages.
(Continued)

*Primary Examiner* — Timothy X Pham
(74) *Attorney, Agent, or Firm* — Sterne, Kessler, Goldstein & Fox P.L.L.C.

(57) ABSTRACT

The purpose of the present invention is to provide a learning model, a signal processor, a flying object, and a program that enable appropriate observation of the situation of an observed object or the environment around the observed object. The learning model is learned by using teaching data with a first received signal as input, the first received signal being based on a reflected electromagnetic wave that is an electromagnetic wave emitted to a first target area and then reflected, and with first meta-information as output, the first meta-information corresponding to the first received signal and having a predetermined item, so as to input a second received signal based on a reflected electromagnetic wave that is an electromagnetic wave emitted to a second target area and then reflected, and to output second meta-information corresponding to the second received signal and having a predetermined item.

8 Claims, 13 Drawing Sheets

(56) References Cited

U.S. PATENT DOCUMENTS

| | | |
|---|---|---|
| 2016/0019458 A1 | 1/2016 | Kaufhold |
| 2018/0043410 A1 | 2/2018 | Schaefer |
| 2019/0204416 A1 | 7/2019 | Yanagi et al. |
| 2021/0019536 A1 | 1/2021 | Motoyama |

FOREIGN PATENT DOCUMENTS

| | | |
|---|---|---|
| CN | 111886626 A | 11/2020 |
| JP | 2009-047516 A | 3/2009 |
| JP | 2016-075558 A | 5/2016 |
| JP | 2019-075037 A | 5/2019 |
| JP | 2019-120543 A | 7/2019 |
| JP | 2019-175142 A | 10/2019 |
| JP | 2019-194821 A | 11/2019 |
| JP | 2020-052977 A | 4/2020 |
| WO | WO2018/155683 A1 | 8/2018 |

OTHER PUBLICATIONS

Decision to Grant a Patent from related Japanese Patent Application No. 2021-101963 dated Dec. 7, 2021, 2 pages.
Notice of Reasons for Refusal from related Japanese Patent Application No. 2021-101963 dated Oct. 29, 2021, 10 pages.
International Search Report and Written Opinion of the International Searching Authority directed to International Patent Application No. PCT/JP2022/002203, mailed Mar. 1, 2022; 19 pages.
Yu, Yang et al., "Observation of Hokkaido-Iburi-Tobu Earthquake by Deep Learning of SAR Images -Research about Detection of Landslide Damage with Small Dataset," IEICE Technical Report, SANE2020-27, Nov. 25, 2020; 9 pages.

Fig. 4

META-INFORMATION MD01

| SHIP ID | FIRST SHIP INFORMATION ||||| FIRST OCEANOGRAPHIC INFORMATION ||
|---|---|---|---|---|---|---|
| | POSITION | TOTAL LENGTH | TYPE | SPEED | WIND DIRECTION | WIND SPEED |
| SHIP01 | (x1,y1) | X1m | TYPE A | Y1kn | NORTHEAST | 7.5m/s |
| SHIP02 | (x2,y2) | X2m | TYPE B | Y2kn | | |
| SHIP03 | (x3,y3) | X3m | TYPE A | Y3kn | | |

Fig. 5

META-INFORMATION MD02

| | | SECOND SHIP INFORMATION | | | | SECOND OCEANOGRAPHIC INFORMATION | | |
|---|---|---|---|---|---|---|---|---|
| SHIP ID | POSITION | SHIP NAME | SHIP REGISTRY | TOTAL LENGTH | SPEED | WIND DIRECTION | WIND SPEED | WEATHER |
| SHIP01 | (X1,Y1) | A01 | Xx1 | X1m | Y1kn | NORTH-EAST | 8m/s | FINE |
| SHIP02 | (X2,Y2) | B02 | Xx2 | X2m | Y2kn | | | |
| SHIP03 | (X3,Y3) | C03 | Xx3 | X3m | Y3kn | | | |
| SHIP04 | (X4,Y4) | D04 | Xx4 | X4m | Y4kn | | | |

LEARNING MODEL, SIGNAL PROCESSOR, FLYING OBJECT, AND PROGRAM

TECHNICAL FIELD

The present invention relates to a learning model, a signal processor, a flying object, and a program.

BACKGROUND ART

Observation of the state of the earth's surface, both on the ground and at sea, is widely conducted using flying objects such as satellites, aircrafts, and drone devices. The observation methods by satellites include those with the acquisition of optical images, with the acquisition of radar images obtained by using the synthetic aperture radar (SAR) technique, so-called SAR images, or with the acquisition of both optical and SAR images combined with each other. Patent Document 1 discloses a geophysical information deciphering image generation method for generating a synthetic image in which a radar image such as a SAR image and an optical image are combined in such a way that geographical objects can be easily distinguished.

CITATION LIST

Patent Document

Patent Document 1: Japanese Patent Application Laid-Open No. 2009-047516

SUMMARY

Technical Problem

A SAR images is generated on the basis of a signal (hereinafter, referred to as "received signal") corresponding to an electromagnetic wave reflected from an observed object when a microwave (electromagnetic wave) is emitted from a satellite equipped with a radar device to the observed object. The SAR image is generated by applying a predetermined compression process to the received signal.

In the compression process of SAR image generation, the received signal is filtered in the frequency domain to remove a part of the received signal data. Filtering reduces the amount of data in the received signal to be compressed, thus reducing the computational burden of the compression process. On the other hand, the removal in the received signal by filtering may cause missing information detectable from the received signal or false detection of information. Missing information or false detection of information affects the precision or accuracy of the observation of the situation of the observed object or of the environment around the observed object.

Therefore, it is an object of the present invention to provide a learning model, a signal processor, a flying object, and a program, which enable the observation of a situation of an observed object or of an environment around the observed object with high precision or high accuracy.

Solution to Problem

A learning model according to an aspect of the present invention is learned by using teaching data with a first received signal as input, the first received signal being based on a reflected electromagnetic wave that is an electromagnetic wave emitted to a first target area and then reflected, and with first meta-information as output, the first meta-information corresponding to the first received signal and having a predetermined item, so as to input a second received signal based on a reflected electromagnetic wave that is an electromagnetic wave emitted to a second target area and then reflected, and to output second meta-information corresponding to the second received signal and having a predetermined item.

According to this aspect, the learning model is learned to output meta-information corresponding to the received signal for an input of the received signal, and operates. The use of this learning model enables, for example, acquisition of meta-information having an item "the total number of moving objects or constructions in the target area" based on the received signal. Since the meta-information is able to be acquired from the received signal without, for example, a SAR image, the information contained in the received signal will not be missing. Therefore, the meta-information indicating the situation of the observed object is able to be observed with high precision or high accuracy.

In the above aspect, the learning model may be learned by using teaching data with the first received signal and a first generated signal generated based on the first received signal as input and with the first meta-information as output, so as to input the second received signal and a second generated signal generated based on the second received signal and to output the second meta-information.

According to this aspect, the teaching data in the learning model further includes the first generated signal that has been generated on the basis of the first received signal. The first generated signal is, for example, a signal (SAR signal) for generating a SAR image based on the first received signal. In the case where an input further includes data generated on the basis of the received signal like the SAR signal and the meta-information of an object or the like is able to be observed more appropriately with the SAR signal by using the learning model with the meta-information as output, the situation of the observed object is able to be observed with high precision or high accuracy.

In the above aspect, the learning model may be learned by using teaching data with the first received signal and information indicating an environment in the first target area as input and with the first meta-information as output, so as to input the second received signal and information indicating an environment in the second target area and to output the second meta-information.

According to this aspect, the teaching data in the learning model further includes information indicating the environment in the first target area. The information indicating the environment in the first target area is, for example, weather conditions such as weather in the first target area, or environmental conditions caused by human factors such as smoke. By using the input that includes the information indicating the environment in the second target area in the output of the second meta-information, the second meta-information is able to be observed with high precision or high accuracy.

In the above aspect, the learning model may be learned by using the teaching data with the first meta-information containing the information indicating the environment in the first target area as output, so as to output the second meta-information containing the information indicating the environment in the second target area.

The use of the learning model according to this aspect enables acquisition of information indicating the environment in the second target area, which is the environment around the observed object. Therefore, the environment around the observed object is able to be observed with high precision or high accuracy.

In another aspect, the signal processor includes a storage unit that stores the learning model according to the above aspect, a signal acquisition unit that acquires the second received signal, and an estimation unit that inputs the second received signal to the learning model and then estimates the second meta-information.

According to this aspect, the use of a signal processor alone enables signal acquisition and estimation of the second meta-information with the learning model. Thereby, for example, even in an environment with certain restrictions on communication with the outside, such as, for example, the space above the earth, meta-information is able to be estimated using the learning model, and the signal processor is able to observe the situation of the observed object with high precision or high accuracy.

In the above aspect, the signal processor may include: the estimation unit that inputs the second received signal at time 1 and the second received signal at time 2 to the learning model according to the above aspect and then estimates the second meta-information at the time 1 corresponding to the second received signal at the time 1 and the second meta-information at the time 2 corresponding to the second received signal at the time 2; and a change determination unit that determines a change in the second target area on the basis of the second meta-information at the time 1 and the second meta-information at the time 2.

According to this aspect, in the case where the second meta-information in the second target area at the time 1 has changed at the time 2, the presence or absence of the change is detectable. Based on the meta-information, the signal processor is able to determine the change in the second target area while observing the situation of the observed object or the environment around the observed object with high precision or high accuracy.

In the above aspect, the signal processor may further include a change information output unit that outputs change information indicating the change in the case where the determined change satisfies a predetermined condition.

According to this aspect, the signal processor outputs the contents of the change as change information in addition to the presence or absence of the change in the case where the change satisfies the predetermined condition. This enables an external device to acquire the details of the change. With the output of the change information, as necessary, from the signal processor based on the conditions, the amount of communication between the signal processor and the outside and the power consumption required for communication in the signal processor are able to be reduced.

In another aspect, a flying object includes a storage unit that stores the learning model according to the above aspect, a signal acquisition unit that acquires the second received signal, an estimation unit that inputs the second received signal to the learning model and then estimates the second meta-information, and a signal output unit that outputs an output signal based on the second meta-information to the outside.

According to this aspect, the flying object is able to estimate the second meta-information using a learning model by itself. Thereby, the flying object, which is placed in an environment with certain restrictions on communication with the outside, is able to estimate the second meta-information without communication with the outside. This reduces the amount of communication of the flying object and the power consumption required for the communication.

Moreover, based on the second meta-information, the flying object is able to output the output information including, for example, the second meta-information itself or the information indicating the change of the second meta-information to the outside. This enables transmission of the second meta-information equivalent to the meta-information observed on the basis of the SAR data to the outside without transmitting large capacity data such as SAR data to the outside. This enables a reduction in the amount of communication between the flying object and the outside and the power consumption required for communication by the flying object.

In another aspect, the program may cause the computer to perform a signal acquisition process for acquiring the second received signal that is input to the storage unit that stores the learning model according to the above aspect, and an estimation process for inputting the second received signal into the learning model and then estimating the second meta-information. This enables the computer to observe meta-information indicating the situation of the observed object with high precision or high accuracy.

In the above aspect, the program may cause the computer to further perform a signal output process for outputting the output signal based on the second meta-information to the outside. This enables, for example, a flying object having a computer, in which the program is recorded, to reduce the amount of communication between the flying object and the outside and the power consumption required for communication by the flying object.

Advantageous Effects of Invention

The present invention provides a learning model, a signal processor, a flying object, and a program that enable appropriate observation of the situation of an observed object or the environment around the observed object.

BRIEF DESCRIPTION OF DRAWINGS

FIG. 4 is a diagram for describing an example of information used for learning the learning model according to the present embodiment.

FIG. 5 is a diagram for describing an example of information used for learning of the learning model according to the present embodiment.

DESCRIPTION OF EMBODIMENTS

Figure 1:
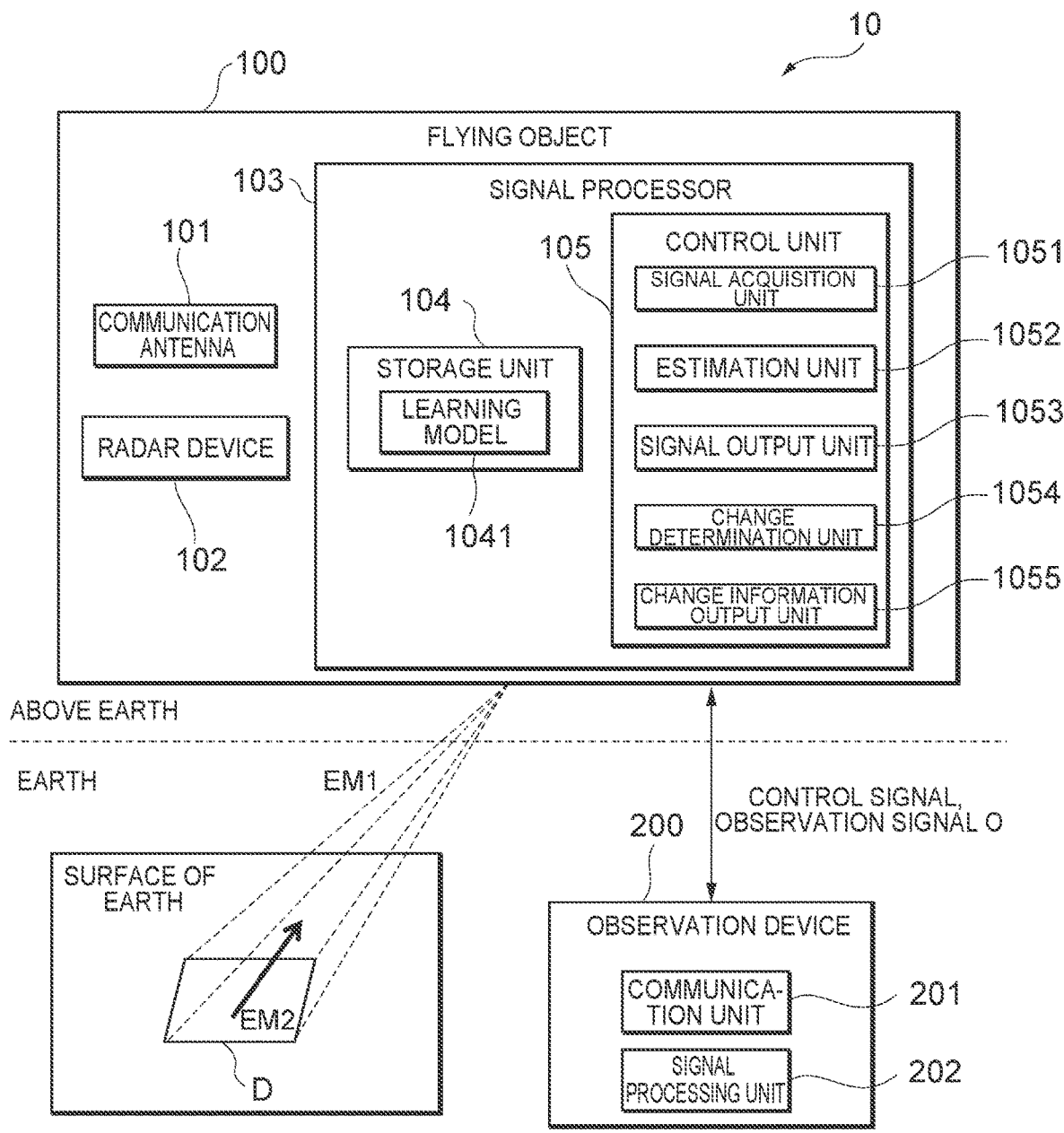
FIG. 1 is a block diagram of an observation system according to the present embodiment.

With reference to the accompanying drawings, preferred embodiments of the present invention are described. In the drawings, those with the same reference numerals have the same or similar configurations.

FIG. 1 illustrates a block diagram of an observation system 10 according to the present embodiment. The observation system 10 includes a flying object 100 and an observation device 200. The flying object 100 is placed in a space above the earth, and the observation device 200 is placed on the earth. In this embodiment, the flying object 100 observes a target area D on the surface of the earth by radar, and an observation signal O processed by the flying object 100 is transmitted to the observation device 200. The observation signal O is, for example, a received signal acquired by the flying object 100 or meta-information corresponding to the received signal, described later.

The flying object 100 includes a communication antenna 101, a radar device 102, and a signal processor 103. The flying object 100, which is a satellite capable of acquiring and processing received signals, is placed in outer space and orbits around the earth. The flying object 100 may be a geostationary satellite. The flying object 100 need only be an aircraft, a helicopter, a drone device, or any other device that is able to be positioned above the earth.

The communication antenna 101 is an antenna for the flying object 100 to communicate with external devices provided on the earth or in outer space.

The radar device 102 irradiates a target area D on the earth's surface with, for example, an electromagnetic wave (EM1), which is a microwave, and acquires a reflected electromagnetic wave EM2 that is an electromagnetic wave EM1 reflected by an observed object in the target area D. The radar device 102 is, for example, a synthetic aperture radar (SAR). The reflected electromagnetic wave EM2 is processed and recorded by the radar device 102 as a received signal (RAW data) based on electromagnetic wave fluctuations able to be handled by the flying object 100. The received signal is recorded, for example, as a signal intensity for each predetermined coordinate of the target area D. The radar device 102 transmits the observation signal O to the observation device 200 through the communication antenna 101.

The radar device 102 includes a processor for controlling the process of acquiring received signals and a storage device in which programs necessary for the control are stored.

The signal processor 103 is an information processor that processes the received signals acquired by the radar device 102. The signal processor 103 is a computer that has a memory or other storage areas to perform a predetermined process by the processor executing a program stored in the storage area.

The signal processor 103 has a storage unit 104 and a control unit 105. The storage unit 104 is, for example, a semiconductor memory such as RAM or an optical disk. The storage unit 104 stores various information used for processing in the signal processor 103.

The storage unit 104 stores a learning model 1041. The learning model 1041 is a program that has been learned to take a received signal as input and to output the meta-information corresponding to the received signal. The details of the meta-information and the learning model 1041 are described later.

The control unit 105 performs signal processing in the signal processor 103. The control unit 105 also controls the transmission of processing results of received signals through the flying object 100. The control unit 105 has a signal acquisition unit 1051, an estimation unit 1052, a signal output unit 1053, a change determination unit 1054, and a change information output unit 1055.

The signal acquisition unit 1051 acquires a received signal from the radar device 102.

The estimation unit 1052 inputs the received signal acquired by the signal acquisition unit 1051 to the learning model 1041 to acquire meta-information corresponding to the received signal.

The signal output unit 1053 outputs the meta-information acquired by the estimation unit 1052 as an observation signal O to the observation device 200 through the communication antenna 101. The signal output unit 1053 may also output the received signal corresponding to the meta-information as the observation signal O together with the meta-information.

The change determination unit 1054 determines a change in a situation of an observed object in the target area D or a change in an environment around the observed object, on the basis of a plurality of pieces of meta-information corresponding to received signals acquired from the target area D at different times.

The change information outputting unit 1055 outputs change information indicating a change determined by the change determination unit 1054, in the case where the change satisfies a predetermined condition. The change information is, for example, information from which the changed meta-information is extracted or information indicating the range of an area in the target area D where a change has occurred, out of the meta-information. The processes by the change determination unit 1054 and the change information output unit 1055 are described later.

The observation device 200 transmits a control signal to the flying object 100 to control the observation of the target area D by the flying object 100 and acquires an observation signal O from the flying object 100. The observation device 200 has a communication unit 201 including an antenna and a control unit that controls communication by the antenna. Information is transmitted to and received from the flying object 100 through the communication unit 201.

A signal processing unit 202 processes the observation signal O received from the flying object 100. The signal processing unit 202 performs processing of visualizing, for example, the observation result in the target area D by means of images, on the basis of the observation signal O acquired from the flying object 100.

Referring to FIGS. 2 to 6, the learning of the learning model 1041 according to the present embodiment is described.

Figure 2:
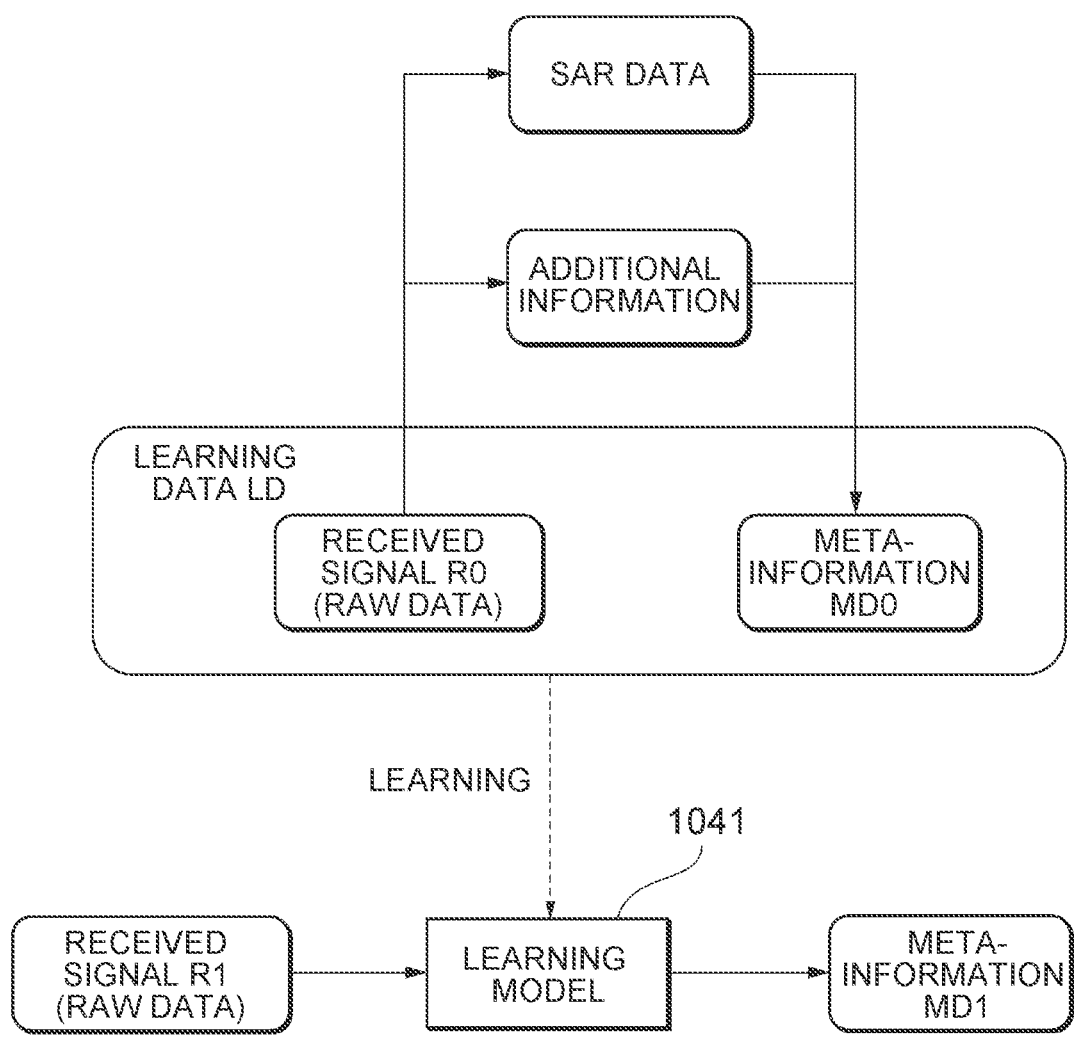
FIG. 2 is a diagram for describing a learning model according to the present embodiment.

FIG. 2 is a diagram for schematically describing the learning and estimation of the learning model 1041. The learning model 1041 is learned using learning data LD as teaching data. The learning data LD contains a pair of a received signal R0 (first received signal) that has been acquired by irradiating a certain target area (first target area) with an electromagnetic wave and meta-information MD0 (first meta-information) corresponding to the received signal R0. The learning model 1041 is learned with the received signal R0 as input and the meta-information MD0 as output.

For the correspondence of the meta-information MD0 to the received signal R0, the received signal R0 is converted to SAR data. Only after a predetermined conversion process, the received signal R0 is able to be information that the user of the observation device 200 is able to understand. The conversion process of SAR data is performed, for example, by the observation device 200. The user is able to understand the observation result based on the received signal R0 through the analysis and visualization processes based on the SAR data.

The SAR data has multiple levels depending on the contents of the conversion of the received signal R0. For example, there is a first level of SAR data obtained by performing range compression and single-look azimuth compression on the received signal R0, as SAR data. The first-level SAR data is complex number information and includes the amplitude information and the phase information of the reflected electromagnetic wave EM2 in the target area D. By visualizing the first level of SAR data as a SAR image, the user is able to understand the contents of the received signal R0.

Another SAR data is the second level of SAR data, which is obtained by performing range compression and multi-look azimuth compression on the received signal R0. The second level of SAR data enables visualization of the received signal R0 with geometrically corrected SAR images.

Still another SAR data is the third level of SAR data, which is obtained by performing range compression, single-look azimuth compression, and ortho correction on the received signal R0. Applying the ortho correction enables acquisition of a SAR image that is able to be superimposed on an optical image.

As described above, the user is able to understand the observation result in the target area D by converting the received signal R0 to SAR data and visualizing the SAR data as the SAR image. The user is able to associate meta-information MD0 with the received signal R0 as information indicating the meaning of the observation result. Alternatively, a computer may be used to associate the meta-information with the received signal after associating the meta-information with the SAR image by using a learning model that associates the SAR image with the meta-information.

The meta-information M0 is, for example, information about a ship and oceanographic conditions in the case of an observation of the ship at sea. Specifically, information corresponding to the items of position, total length, and type of the ship is acquired from the SAR image, as information of the ship. In addition, the ship's speed is able to be acquired by using phase information based on the SAR data with complex components. Furthermore, the wind direction and the wind speed at sea is able to be acquired on the basis of the SAR data, as information on oceanographic conditions. The wind direction and wind speed at sea are estimated on the basis of the backscattering coefficient of the SAR data and the correlation calculated based on the actually-measured wind direction and wind speed data. The backscattering coefficient is a coefficient based on the intensity of the electromagnetic wave that returns in the irradiation direction out of irradiated electromagnetic waves scattered on the surface of the target area.

Additional information other than SAR data may be used to associate meta-information MD0 with the received signal R0. For example, the meta-information MD0 about a ship may include AIS information, which is the information such as position, ship name, ship registry, and total length, acquired from an automatic identification system (AIS). The meta-information MD0 may be generated on the basis of the AIS information obtained at the time when the received signal R0 is acquired. As for information on the oceanographic conditions, the meta-information MD0 may include the wind direction, wind speed, and weather acquired from buoys located in offshore areas.

Meta-information MD0 has various items depending on the observed target. Meta-information for a land-based moving object, such as an automobile and an animal, includes information on the movement locus of the moving object. This information is acquired from a change in SAR data due to a change in interference of the reflected electromagnetic wave caused by the moving object. In this case, the meta-information may include the movement locus based on a GPS device attached to the moving object.

In the case where an inundated area at the time of a disaster is the observed target, the range of the inundated area may be acquired as a low brightness area in the SAR image as meta-information. In this case, the meta-information may include the range of the inundated area based on an optical image acquired by an aircraft or a satellite.

The meta-information used for crop management may be the degree of crop growth as meta-information. The degree of crop growth is estimated on the basis of the backscattering coefficient of the SAR data and a correlation calculated based on the actually-observed degree of crop growth. In this case, the meta-information may include the spectral reflectance characteristics from optical measurements and the height of the crop actually measured.

In the detection of buildings, information on a new building may be used as meta-information. The information on the new building is estimated on the basis of the backscattering coefficient of the SAR data and the correlation calculated based on the information on the new building actually observed. In this case, the information on the new building may be acquired from the building information detected from optical images or from map information. In addition, information on the building type may be acquired on the basis of a map or the like, and may be used as meta-information.

Simulation of electromagnetic waves may also be used to associate meta-information with received signals. In the simulation model, irradiation and reflection of electromagnetic waves are able to be simulated to generate received signals and SAR data. In this case, meta-information such as the conditions in the simulation model such as, for example, the number of ships, the shapes of ships, and the trajectory of the position of a moving object is meta-information to be associated with the generated received signals and SAR data.

Upon the input of a received signal R1 (second received signal) acquired by the flying object 100 based on the electromagnetic wave applied by the flying object 100 to another target area (second target area) into the learned learning model 1041, the learning model 1041 outputs meta-information MD1 (second meta-information) corresponding to the received signal R1.

In addition to the received signal R1, the learning model 1041 may receive additional information obtained when the received signal R1 is acquired and then output the meta-information MD1. For example, in the above example of a ship, AIS information and information from buoys at sea may be additional information. In this specification, it is assumed that the learning model 1041 has been learned using meta-information MD0 based on the SAR data and on the additional information including the AIS information and the information from the buoys at sea. In this case, either the AIS information or the information from the buoys at sea is input to the learning model 1041 as additional information when estimating the meta-information MD1 using the learning model 1041. The additional information may be added to the SAR data in the input to the learning model 1041, so that the meta-information is observed with higher precision or higher accuracy.

Referring to FIGS. 3 to 6, the relationship between the received signal R0 and the meta-information MD0 is described. This embodiment is described by giving an example of a learning model that enables estimation of ships at sea and the oceanographic conditions, namely, the environment around the ships.

Figure 3:
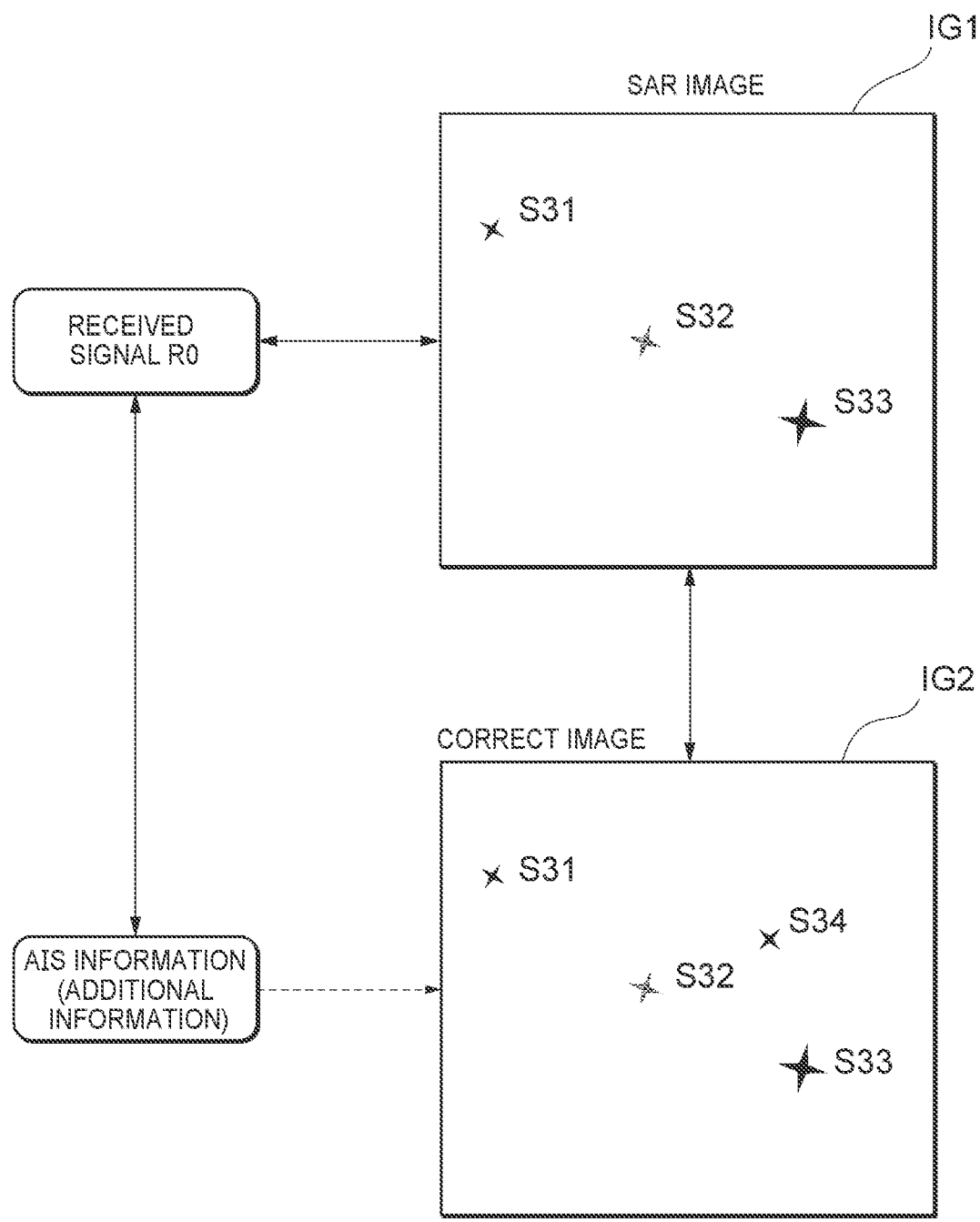
FIG. 3 is a diagram for describing learning of the learning model according to the present embodiment.

In the example illustrated in FIG. 3, a SAR image IG1 in the target area D is generated on the basis of the received signal R0 corresponding to the target area D. In the SAR image IG1, ships S31, S32, and S33 are detected. In this case, as illustrated in FIG. 4, the meta-information MD01, which includes first ship information about the ship and first oceanographic information about the oceanographic conditions, is acquired from the SAR image IG1. The meta-information MD01 is associated with the received signal R0. Note that the item "ship ID" in the first ship information and the second ship information described later is arbitrary information used to identify a ship in the meta-information MD01.

In addition, based on the AIS information in the target area D obtained when the received signal R0 corresponding to the target area D is acquired, the meta-information MD02 is acquired as illustrated in FIG. 5. The meta-information MD02 includes the second ship information about a ship and the second oceanographic information about oceanographic conditions. The second ship information and the second oceanographic information have different items from those of the first ship information and the second oceanographic information. The meta-information MD02 is associated with the received signal R0.

In the case of being based on the AIS information, the meta-information MD02 indicates that the ship S34 is present in the target area D in addition to the ships S31 to S33, as illustrated in the correct image IG2 in FIG. 3.

The meta-information MD0, which is associated with the received signal R0 as the learning data LD, is prepared based on the meta-information MD1 and the meta-information MD2. The meta-information MD0 includes the third ship information on the basis of the first ship information so as to have the same items as those of the first ship information with respect to the ship. Meta-information MD0 also includes the third oceanographic information on the basis of the second oceanographic information so as to have the same items as those of the second oceanographic information with respect to the oceanographic conditions. Thus, the meta-information MD0 used for generating a model is able to be generated by combining the meta-information MD01 based on the SAR image and the meta-information MD02 based on information from other devices. In addition, the meta-information MD0 may directly be either of the meta-information MD01 and the meta-information MD02.

The learning model 1041 is learned by using the learning data LD prepared as described above, for example, by a general machine learning method such as a method using a neural network. The learning model 1041 may be composed of a single learning model or a combination of multiple learning models.

Figure 7:
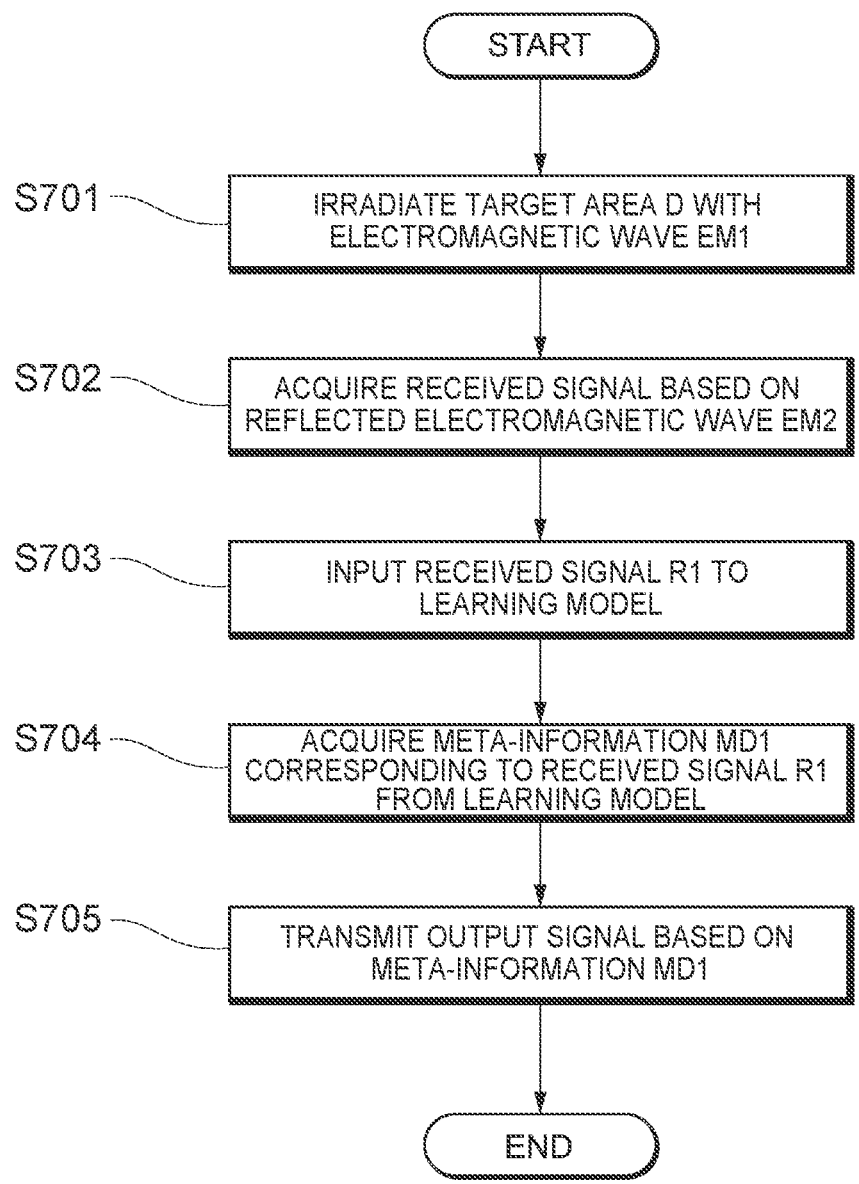
FIG. 7 is a flowchart for describing a process in a flying object according to the present embodiment.
Figure 8:
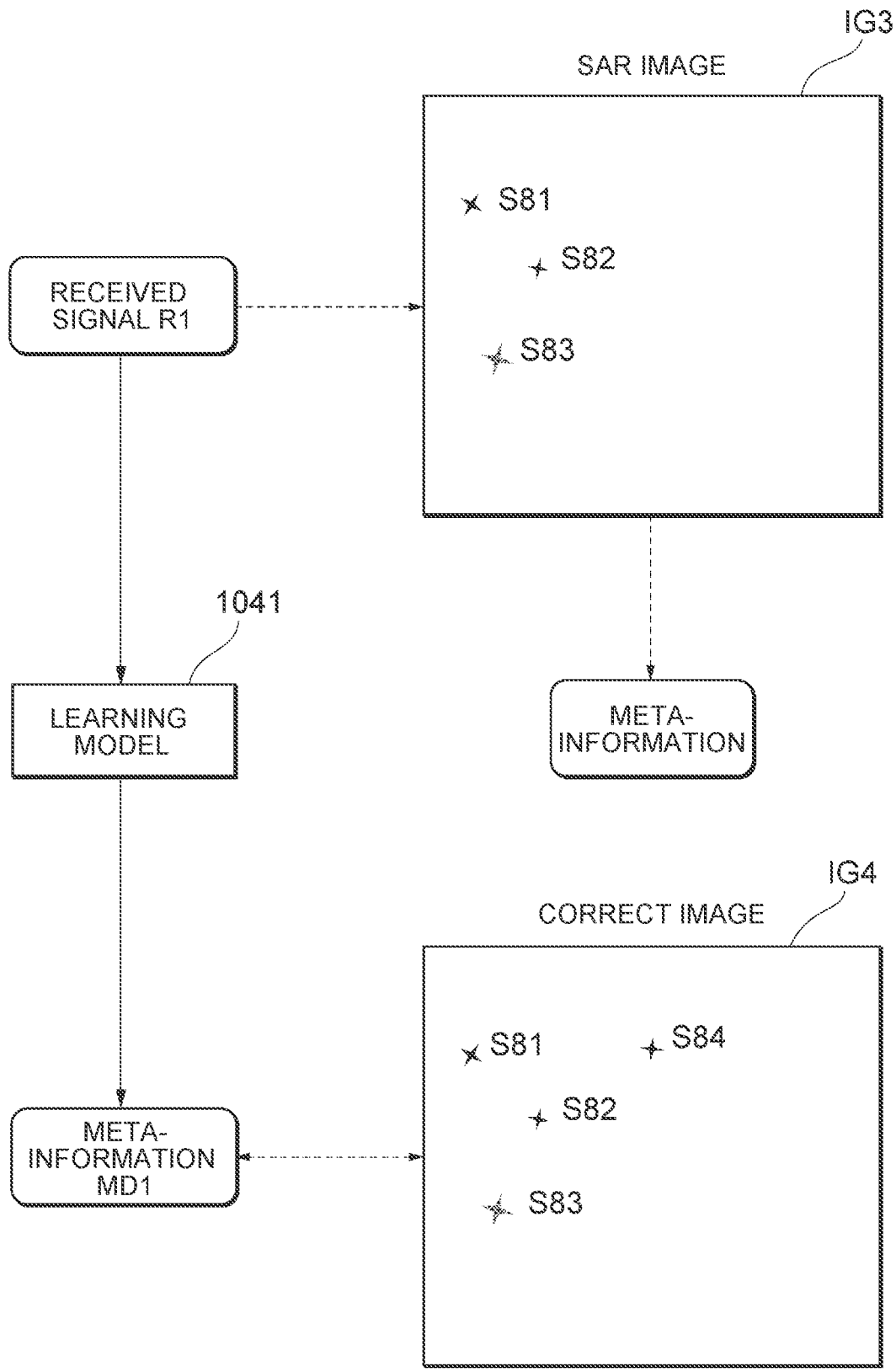
FIG. 8 is a diagram for describing estimation of meta-information by a signal processor according to the present embodiment.
Figure 9:
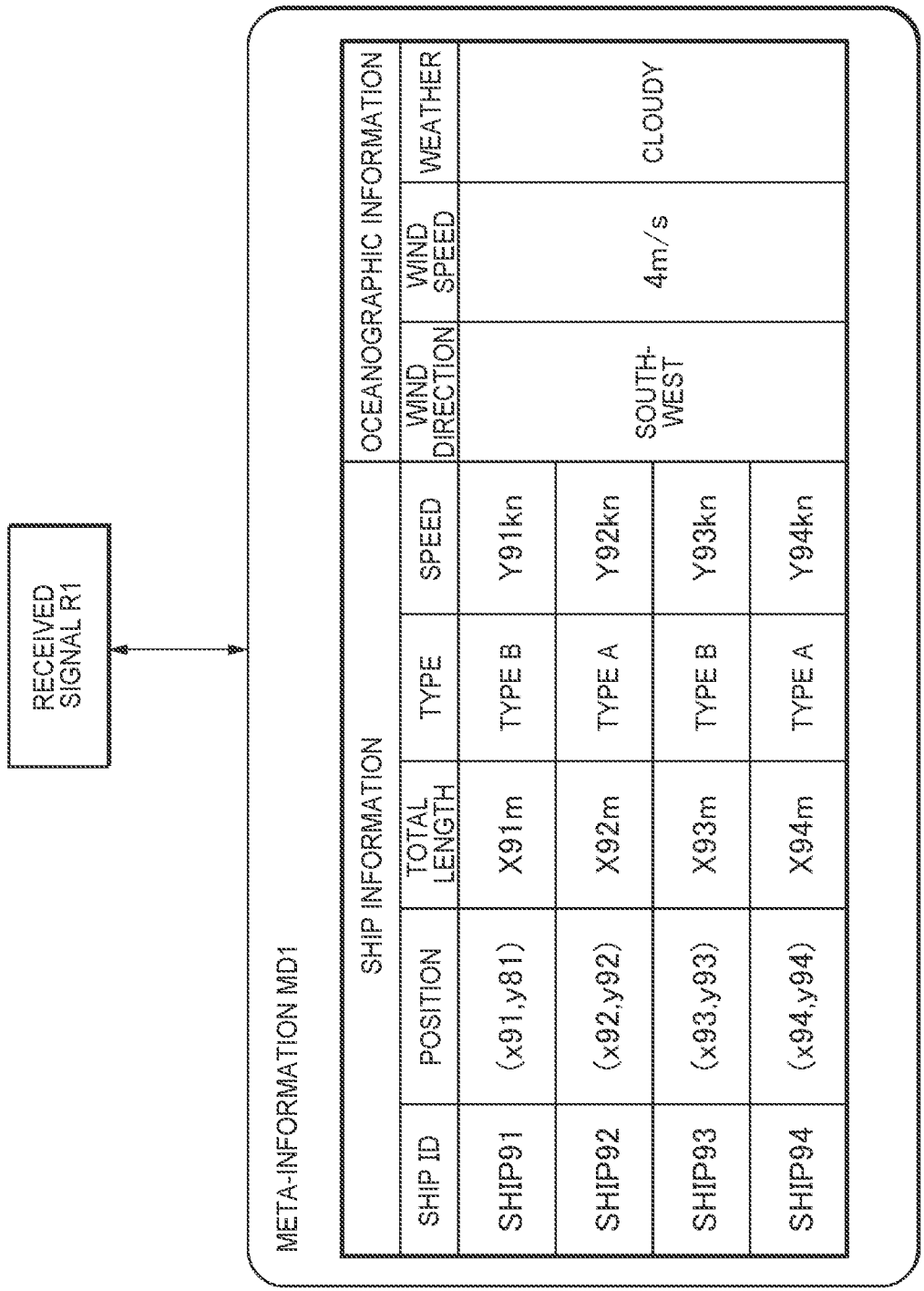
FIG. 9 is a diagram for describing an example of the meta-information estimated by the signal processor according to the present embodiment.

Referring to FIGS. 7 to 9, the processing by the flying object 100 is described.

In step S701 of FIG. 7, the radar device 102 irradiates the target area D with the electromagnetic wave EM1. The timing of the irradiation may be controlled by the observation device 200 or specified in advance by the flying object 100.

In step S702, the signal acquisition unit 1051 acquires the received signal R1 based on the reflected electromagnetic wave EM2 detected by the radar device 102 from the radar device 102.

In step S703, the estimation unit 1052 inputs the received signal R1 to the learning model 1041. In addition to the received signal R1, the estimation unit 1052 may input additional information obtained when the received signal R1 is acquired into the learning model 1041.

In step S704, the estimation unit 1052 acquires the meta-information MD1 corresponding to the received signal R1 from the learning model 1041.

In step S705, the signal output unit 1053 outputs an output signal based on the meta-information MD1 to the observation device 200. The output signal based on the meta-information MD1 is a signal that conveys all or a part of the meta-information MD1. Alternatively, the output signal may be a signal that conveys information of the result of information processing to the meta-information.

Figure 6:
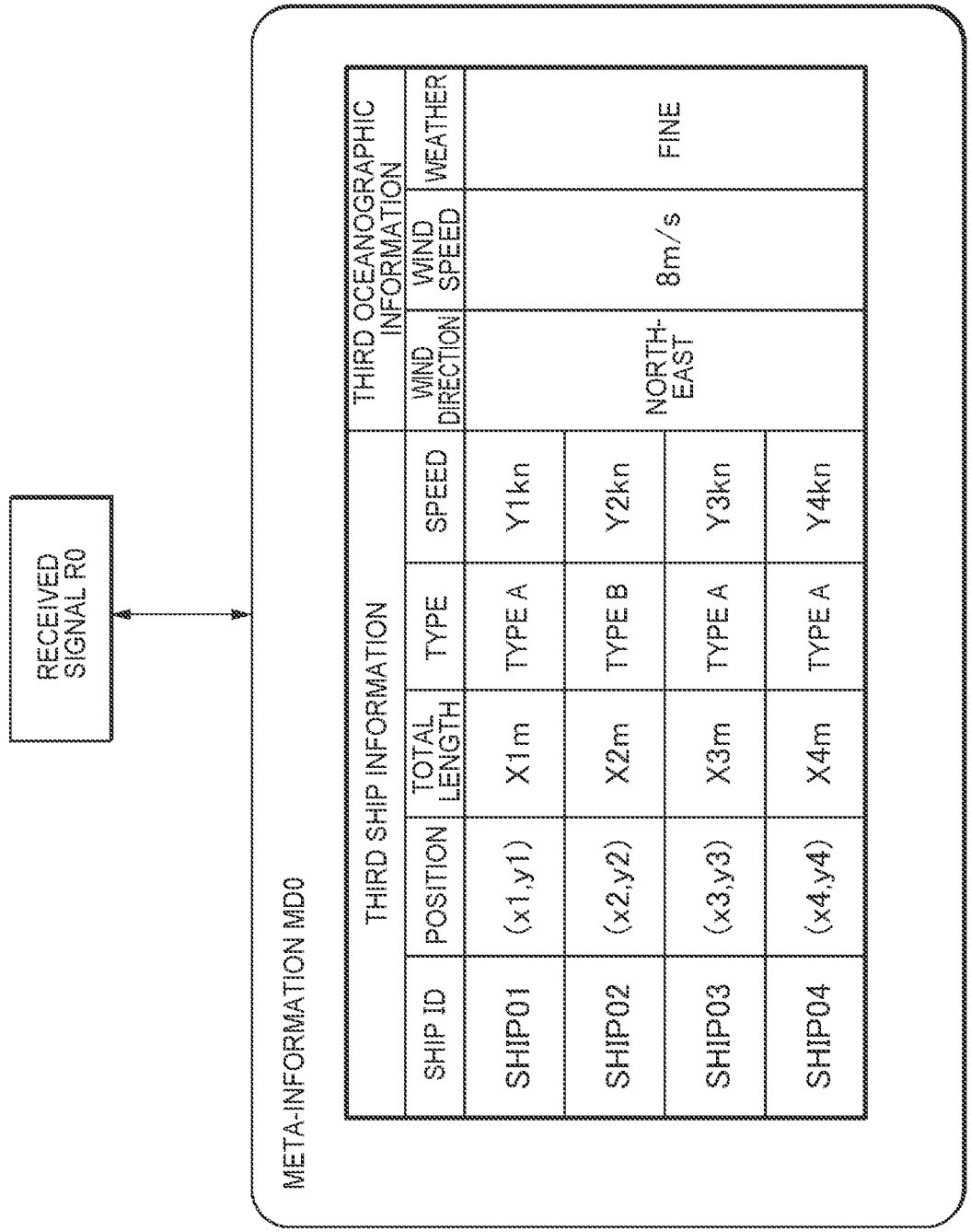
FIG. 6 is a diagram for describing correspondence of teaching data used for learning of the learning model according to the present embodiment.

Referring to FIG. 8, the estimation of meta-information by the learning model 1041 is described. In this specification, description will be made on a case of using the learning model 1041 learned with the learning data LD having the correspondence as illustrated in FIG. 6.

The received signal R1 is information that may be converted into SAR data indicating the state illustrated in the SAR image IG3. The meta-information generated based on the SAR image IG3 includes information on ships S81 to S83. On the other hand, the actual situation is assumed to be the one illustrated in the correct image IG4. In other words, the information about the ship S84 is missing due to the conversion of the received signal R1 into SAR data.

In this case, the signal processor 103 is able to input the received signal R1 to the learning model 1041 to acquire the meta-information MD1 as illustrated in FIG. 9. The meta-information MD1 contains information indicating four ships. In other words, the signal processor 103 is able to detect meta-information that cannot be detected from the SAR data.

By using the received signal and the learning model 1041, the meta-information is able to be estimated without being affected by the conversion to the SAR data. Although not illustrated, this enables appropriate estimation of meta-information, for example, even in the case of false detection, such as detection of a false image of an object that should not be detected in the SAR image.

Figure 10:
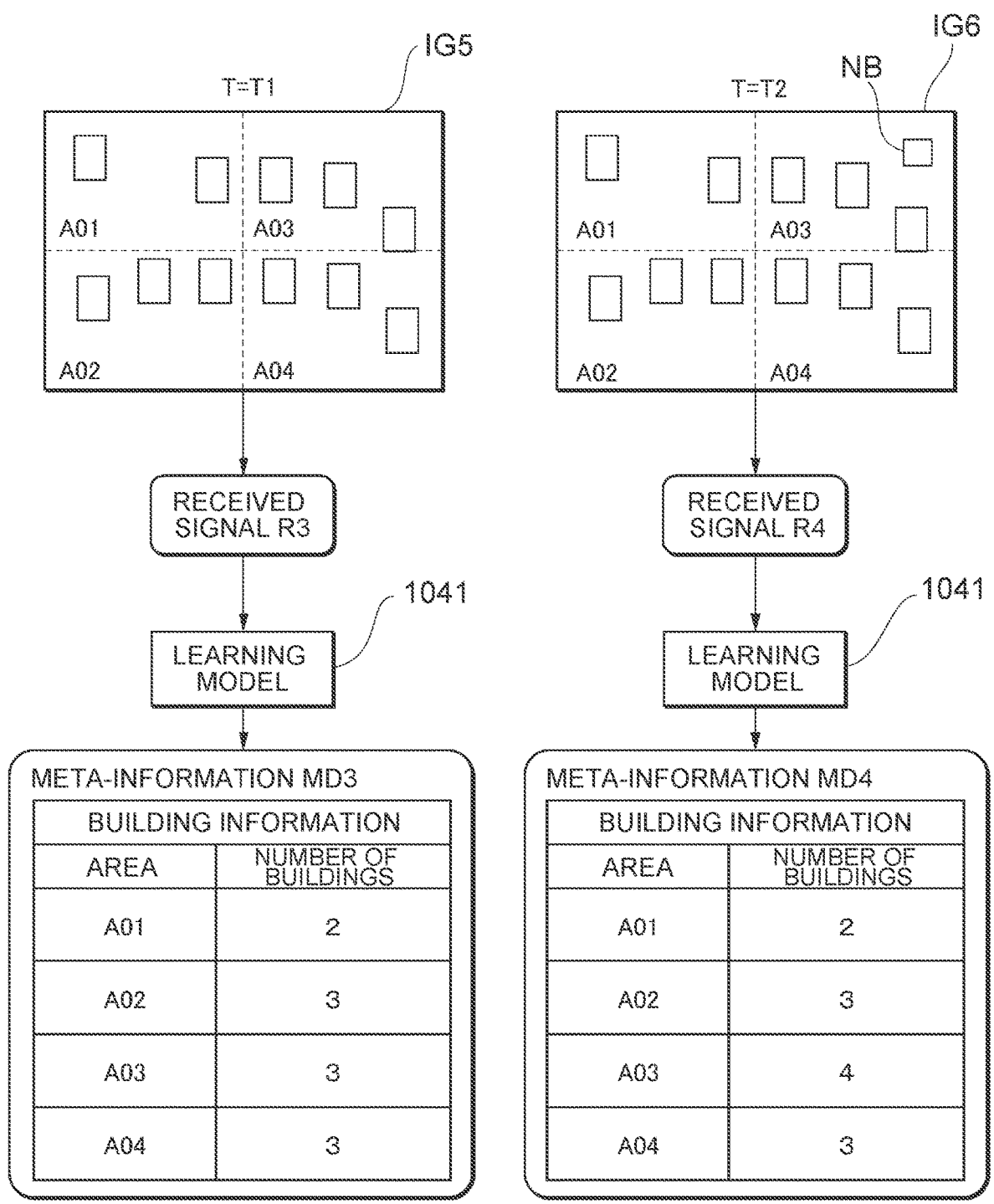
FIG. 10 is a diagram for describing determination of a change in the meta-information by the signal processor according to the present embodiment.
Figure 11:
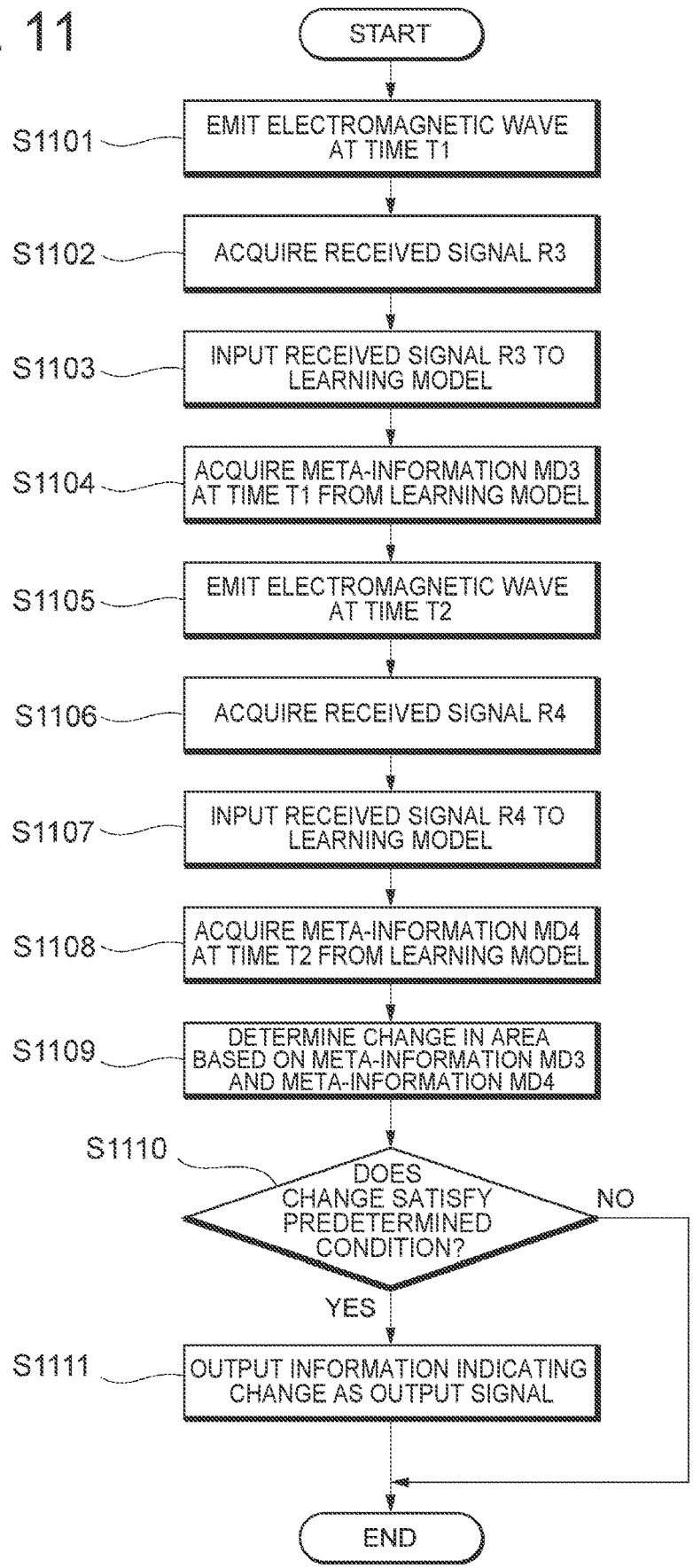
FIG. 11 is a flowchart for describing the processing of determining the change by the signal processor according to the present embodiment.

Referring to FIGS. 10 and 11, the detection of changes in meta-information by the flying object 100 is described.

In FIG. 10, description is made on the detection of changes in meta-information about buildings. At a certain time T1 (time 1), buildings are placed as illustrated in the placement image IG5. At another time T2 (time 2), buildings are placed in the same area as illustrated in the placement image IG6. The placement images IG5 and IG6 are, for example, optical or SAR images of the buildings observed from above from the air or outer space. The arrangement images IG5 and IG6 have predetermined areas of A01 to A04. As illustrated in the placement image IG6, a new building NB is constructed in the area A03 at time T2.

The following describes an example where the above changes are detected by using the learning model 1041. It is assumed here that the learning model 1041 has learned to output building information, which is the number of buildings in each area, as meta-information in response to an input of a received signal.

FIG. 11 illustrates a flowchart of the processing by the flying object 100.

In step S1101, the radar device 102 irradiates the target area with an electromagnetic wave at time T1.

In step S1102, the signal acquisition unit 1051 acquires a received signal R3 based on the reflected electromagnetic wave detected by the radar device 102 from the radar device 102. The received signal R3 may be stored in the storage unit 104.

In step S1103, the estimation unit 1052 inputs the received signal R3 to the learning model 1041.

In step S1104, the estimation unit 1052 acquires meta-information MD3 corresponding to the received signal R3 from the learning model 1041. The meta-information MD3 may be stored in the storage unit 104.

In step S1105, the radar device 102 irradiates the target area with an electromagnetic wave at time T2.

In step S1106, the signal acquisition unit 1051 acquires the received signal R4 based on the reflected electromagnetic wave detected by the radar device 102 from the radar device 102.

In step S1107, the estimation unit 1052 inputs the received signal R4 to the learning model 1041.

In step S1108, the estimation unit 1052 acquires meta-information MD4 corresponding to the received signal R4 from the learning model 1041.

In step S1109, the change determination unit 1054 determines the change in the target area on the basis of the meta-information MD3 and the meta-information MD4. In the case of FIG. 10, the meta-information MD04 indicates that the number of buildings in the area A03 has increased to four. Therefore, the change determination unit 1054 determines that a change has occurred in the number of buildings.

In step S1110, the change information output unit 1055 determines whether the change satisfies a predetermined condition. Here, the predetermined condition is a result of determination of whether or not there is a change or a condition related to the specific content of the change. For example, in the example illustrated in FIG. 10, the condition may be that there is a change in a certain area or that a change in which the number of buildings increases or decreases occurs in one of the areas, as the specific content of the change.

In this specification, it is assumed that the condition is that a change in which the number of buildings increases occurs in one of the areas. In this case, the change information output unit 1055 determines that the change satisfies the predetermined condition.

If it is determined that the change satisfies the predetermined condition, in step S1111, the change information output unit 1055 outputs the information indicating the change, as an output signal, to the observation device 200. Unless the predetermined condition is satisfied, the processing is terminated. The output signal is, for example, a signal for conveying the meta-information MD3 and MD4. Alternatively, the output signal is a signal for extracting meta-information about the area A03 where a change has occurred and conveying the extracted meta-information. Alternatively, the output signal may be a signal for conveying information about the coordinates indicating a part where the change has occurred in more details, out of the area A03 that has been determined to have a change.

The flying object 100 is able to detect a change in the target area on the basis of meta-information with good precision or good accuracy based on the received signal. Therefore, the precision or accuracy of change detection also increases.

The flying object 100 determines a change and transmits the meta-information itself or the information indicating the range of the change to the observation device 200 only for the area where the change has occurred, thereby reducing the amount of communication to the observation device 200. This allows the flying object 100 to reduce the power consumption. This is an advantage for the flying object 100, which is limited in available power due to the environment of the space above the earth.

Figure 12:
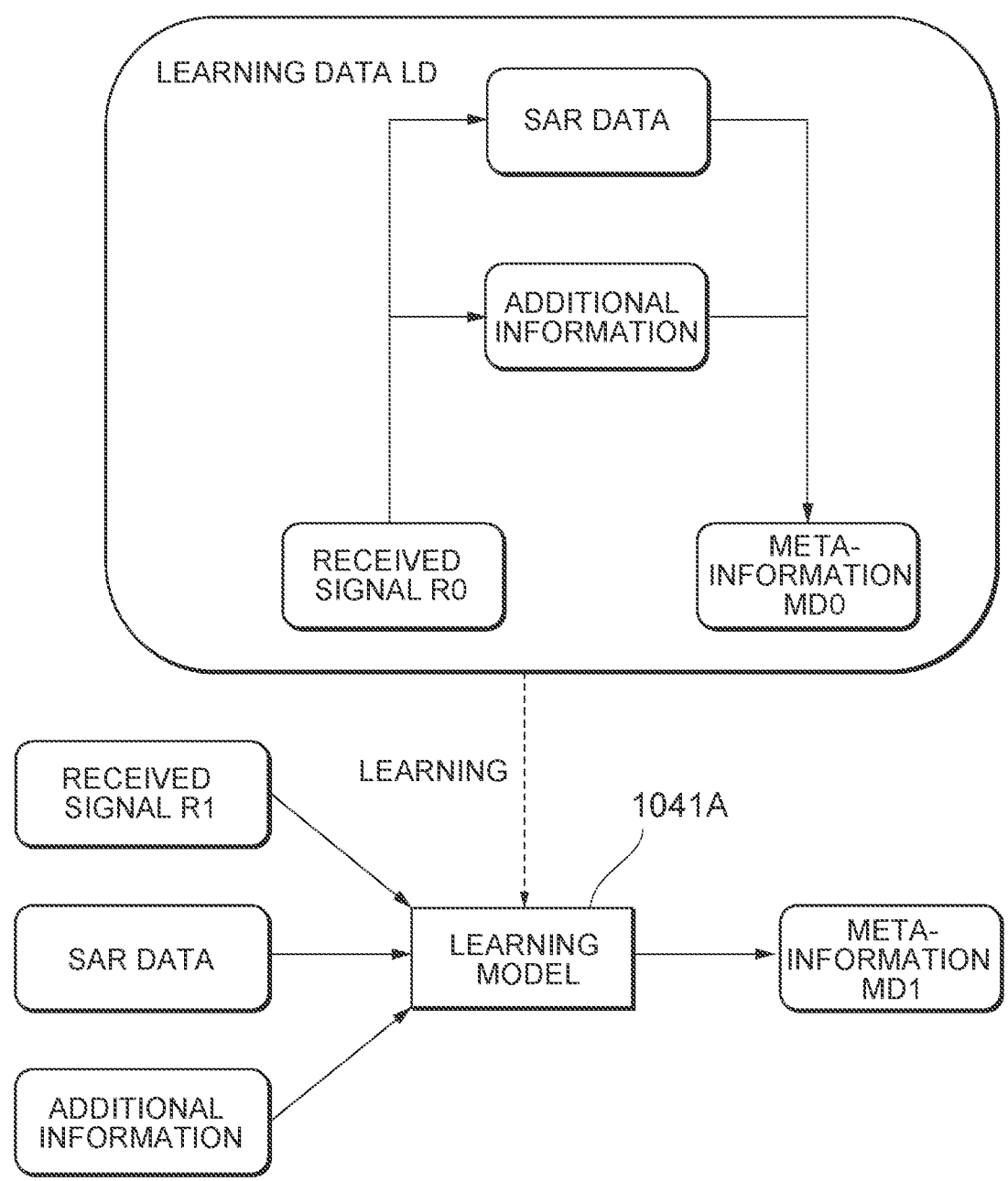
FIG. 12 is a diagram for describing another aspect of learning and estimation of a learning model.

FIG. 12 schematically illustrates the learning and estimation of the learning model 1041A. The learning model 1041A includes, as the learning data LD, the SAR data (the first generated signal) generated on the basis of the received signal R0 and additional information, in addition to the received signal R0 and the meta-information MD0.

By preparing the learning data LD in this way, the learning model 1041A is able to estimate the meta-information MD1 using the received signal R1, the SAR data generated based on the received signal R1 (the second generated signal), and the additional information corresponding to the received signal R1 as input.

For example, as additional information, the weather of the target area is able to be used as information indicating the environment in the target area when the received signal R0 is acquired. When estimating the meta-information MD1 using the learning model 1041A, information indicating the environment in the target area when the received signal R1 is acquired may be acquired from other devices and be included into the input of the learning model 1041A. This enables estimation of the meta-information MD1 with higher precision or higher accuracy.

Figure 13:
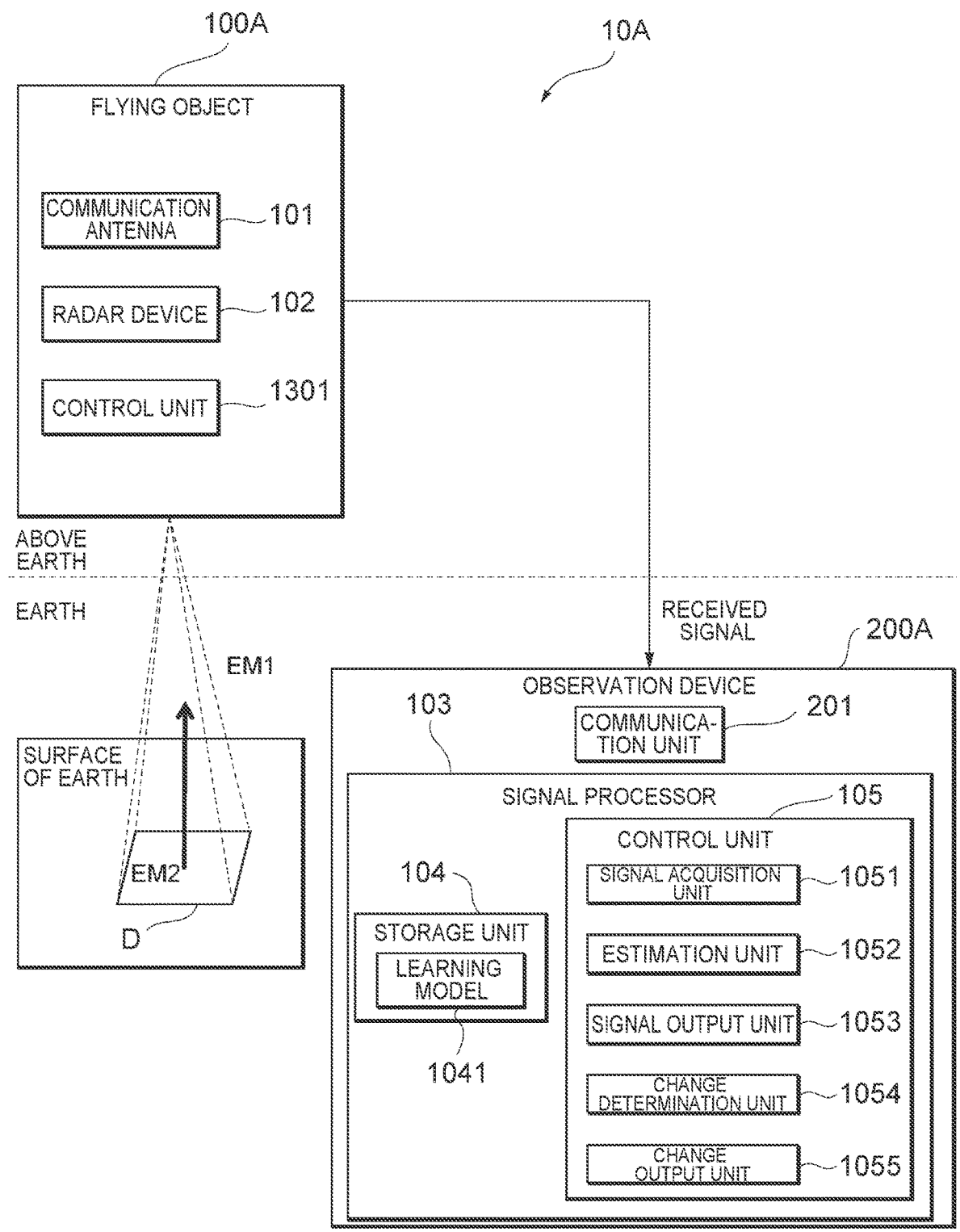
FIG. 13 is a block diagram illustrating another aspect of the observation system.

FIG. 13 illustrates a block diagram of the observation system 10A as another embodiment. As illustrated in FIG. 13, the signal processor 103 may also be provided so as to be contained in an observation device 200A. The control unit 1301 of a flying object 100A transmits the received signals acquired by the radar device 102 to the observation device 200A. The signal processor 103 of the observation device 200A may be configured to perform the above processing.

The embodiments described above are intended to facilitate understanding of the present invention and are not intended to be construed as limiting the present invention. The elements of the embodiments and their conditions are not limited to those illustrated in the examples, but may be changed as necessary. Additionally, it is also possible to partially replace or combine different configurations.

REFERENCE SIGNS LIST

10 observation system
100 flying object
101 communication antenna
102 radar device
103 signal processor
104 storage unit
1041 learning model
105 control unit
1051 signal acquisition unit
1052 estimation unit 1053 signal output unit
1054 change determination unit
1055 change information output unit
200 observation device
201 communication unit
202 signal processing unit

What is claimed is:

1. A signal processor, comprising:
a storage unit that stores a learning model, wherein:
   the learning model is learned by using teaching data with a first synthetic aperture radar received signal as input, the first synthetic aperture radar received signal being based on a reflected electromagnetic wave that is an electromagnetic wave emitted to a first target area and then reflected, and with first meta-information as output, the first meta-information corresponding to the first synthetic aperture radar received signal and having a predetermined item; and
   the learning model outputs second meta-information having the predetermined item in response to a second synthetic aperture radar received signal as input, the second synthetic aperture radar received signal being based on a reflected electromagnetic wave that is an electromagnetic wave emitted to a second target area and then reflected;
a signal acquisition unit that acquires the second synthetic aperture radar received signal;
an estimation unit that inputs the second synthetic aperture radar received signal at time 1 and the second synthetic aperture radar received signal at time 2 to the learning model and then estimates the second meta-information at the time 1 corresponding to the second synthetic aperture radar received signal at the time 1 and the second meta-information at the time 2 corresponding to the second synthetic aperture radar received signal at the time 2; and
a change determination unit that determines a change in the second target area on the basis of the second meta-information at the time 1 and the second meta-information at the time 2.

2. The signal processor according to claim 1, wherein:
the learning model is learned by using teaching data with the first synthetic aperture radar received signal and a first generated signal generated based on the first synthetic aperture radar received signal as input and with the first meta-information as output; and
the learning model outputs the second meta-information in response to the second synthetic aperture radar received signal and a second generated signal generated based on the second synthetic aperture radar received signal.

3. The signal processor according to claim 1, wherein:
the learning model is learned by using teaching data with the first synthetic aperture radar received signal and information indicating an environment in the first target area as input and with the first meta-information as output; and
the learning model outputs the second meta-information in response to the second synthetic aperture radar received signal and information indicating an environment in the second target area as input.

4. The signal processor according to claim 1, wherein:
the learning model is learned by using the teaching data with the first meta-information containing the information indicating the environment in the first target area as output; and
the learning model outputs the second meta-information containing the information indicating the environment in the second target area.

5. The signal processor according to claim 1, further comprising
a change information output unit that outputs change information indicating a determined change in the case where the determined change satisfies a predetermined condition.

6. A flying object comprising the signal processor according to claim 1, the signal processor further comprising a signal output unit that outputs an output signal based on the second meta-information.

7. A non-transitory computer-readable medium storing a program that causes a computer to perform:
a signal acquisition process for acquiring a second synthetic aperture radar received signal that is input into a storage unit that stores a learning model, wherein:
   the learning model is learned by using teaching data with a first synthetic aperture radar received signal as input, the first synthetic aperture radar received signal being based on a reflected electromagnetic wave that is an electromagnetic wave emitted to a first target area and then reflected, and with first meta-information as output, the first meta-information corresponding to the first synthetic aperture radar received signal and having a predetermined item; and
   the learning model outputs second meta-information having the predetermined item in response to a second synthetic aperture radar received signal as input, the second synthetic aperture radar received signal being based on a reflected electromagnetic wave that is an electromagnetic wave emitted to a second target area and then reflected;
an estimation process for inputting the second synthetic aperture radar received signal at time 1 and the second synthetic aperture radar received signal at time 2 to the learning model and then estimating the second meta-information at the time 1 corresponding to the second synthetic aperture radar received signal at the time 1 and the second meta-information at the time 2 corresponding to the second synthetic aperture radar received signal at the time; and
a change determination process for determining a change in the second target area on the basis of the second meta-information at the time 1 and the second meta-information at the time 2.

8. The non-transitory computer-readable medium storing program according to claim 7, further comprising causing the computer to perform a signal output process for outputting the output signal based on the second meta-information.

* * * * *